C. H. HELSLEY.
BRACE FOR RADIUS RODS.
APPLICATION FILED JAN. 7, 1919.
1,315,552.
Patented Sept. 9, 1919.
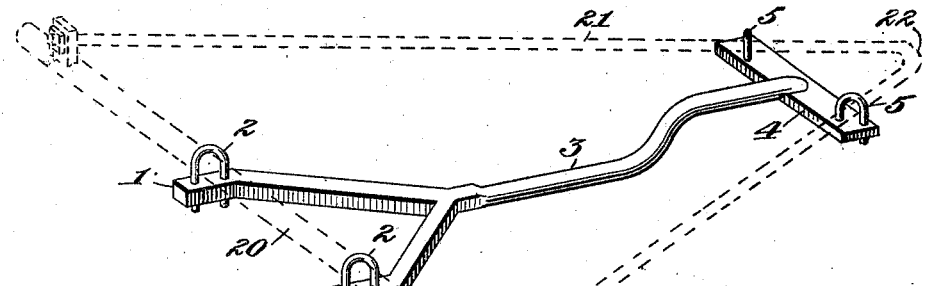
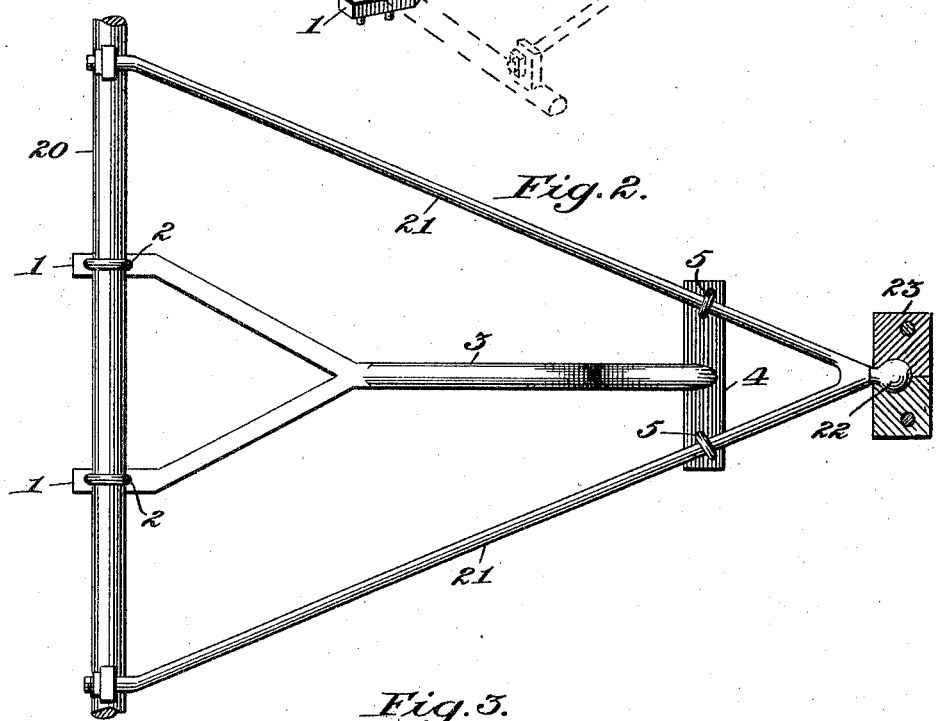
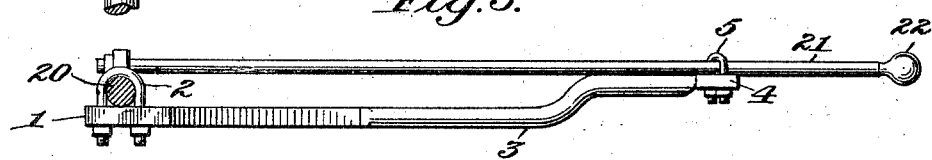

UNITED STATES PATENT OFFICE.

CHARLES H. HELSLEY, OF ROGERSON, IDAHO.

BRACE FOR RADIUS-RODS.

1,315,552.  Specification of Letters Patent.  Patented Sept. 9, 1919.

Application filed January 7, 1919. Serial No. 270,016.

*To all whom it may concern:*

Be it known that I, CHARLES H. HELSLEY, a citizen of the United States, residing at Rogerson, in the county of Twin Falls and State of Idaho, have invented certain new and useful Improvements in Braces for Radius-Rods, of which the following is a specification.

This invention relates to radius rod braces.

The object of the invention is to provide a radius rod brace for Ford cars which is constructed with a forked front extension adapted to cross and be secured to the front axle at opposite sides of the middle thereof and having an upwardly offset stem extending rearwardly and terminating in a horizontal cross piece adapted to cross and be secured to the rear converging ends of the radius rod just in advance of the usual ball and socket connection with the crossbar of the Ford frame; the said stem extending centrally and longitudinally of the radius rod.

This object is accomplished by the construction shown in the accompanying drawing, in which:

Figure 1 is a perspective of the improved brace.

Fig. 2 is a plan of the same in position.

Fig. 3 is a side elevation thereof.

The brace is formed Y shape and the front ends 1, 1 of the fork extend parallel and across the front axle 20 adjacent to the middle thereof. These parallel ends 1, 1 are secured to the middle portion of the front axle 20 by the U-shaped bolts 2, 2. The stem 3 of the brace extends rearwardly and is offset upwardly near its rear end and is there provided with a horizontal crossbar 4 provided with U bolts 5 at its ends. This crossbar 4 crosses the rear converging ends of the radius rod 21 just in advance of its usual ball and socket connection 22 with the frame bar 23, and is rigidly connected to the ends of rod 21 by said bolts 5.

The brace rod lies in a plane just below the plane of the radius rod 21 and, being secured at its rear end to the rear end of said rod and at its front end to the front axle at the middle thereof, it is apparent that the radius rod will be greatly strengthened as to longitudinal strain and also as to torsional strain and lateral strains. Moreover, the front axle will be braced and steadied and vibration so reduced as to permit of easier steering. A vehicle being towed will have its front axle greatly strengthened by my brace against bending, as will be readily apparent.

What is claimed is:

1. A brace for radius rods formed with a horizontal front fork to cross the middle portion of the front axle, a rearwardly extending longitudinal stem offset upwardly and terminating in a horizontal cross piece adapted to be rigidly secured at its ends to the rear converging ends of the radius rod arms.

2. The combination with a V shape radius rod of a Y shape brace the forked end of which is rigidly secured to the front axle between the diverging ends of said radius rod and the longitudinal stem of which is offset upwardly and provided with an integral cross piece rigidly secured to the rear converging ends of said radius rod.

In testimony whereof I affix my signature.

CHARLES H. HELSLEY.

Copies of this patent may be obtained for five cents each, by addressing the "Commissioner of Patents, Washington, D. C."